3 Sheets—Sheet 1.

H. F. COX.

RAILWAY CROSSING.

No. 10,265. Reissued Jan. 2, 1883.

WITNESSES:

Fred. G. Dieterich

Wm. Holfenter

INVENTOR.

H. F. Cox by

H. W. Beadle & Co.

ATTORNEYS

3 Sheets—Sheet 2.

H. F. COX.

RAILWAY CROSSING.

No. 10,265. Reissued Jan. 2, 1883.

WITNESSES:

Fred. G. Dieterich

Wm. Wolfenter

INVENTOR.

H. F. Cox, by

H. W. Beadle & Co.

ATTORNEYS

H. F. COX.

RAILWAY CROSSING.

No. 10,265. Reissued Jan. 2, 1883.

WITNESSES:

Fred. L. Dieterich

Wm Molfenter

INVENTOR.

H. F. Cox by

H. W. Beadle & Co.

ATTORNEYS

UNITED STATES PATENT OFFICE.

HENRY F. COX, OF ALTOONA, PENNSYLVANIA.

RAILWAY-CROSSING.

SPECIFICATION forming part of Reissued Letters Patent No. 10,265, dated January 2, 1883.

Original No. 262,931, dated August 22, 1882. Application for reissue filed December 6, 1882.

*To all whom it may concern:*

Be it known that I, HENRY F. COX, of Altoona, county of Blair, and State of Pennsylvania, have invented new and useful Improvements in Railway-Crossings; and I do declare that the following is a full and exact description of the same, reference being had to the accompanying drawings, and to the letters of reference marked thereon.

This invention consists in a special arrangement of turn-outs and switches at a railroad-crossing by means of which it is made absolutely impossible for one train to collide with another, as will be fully described hereinafter.

Figure 1:
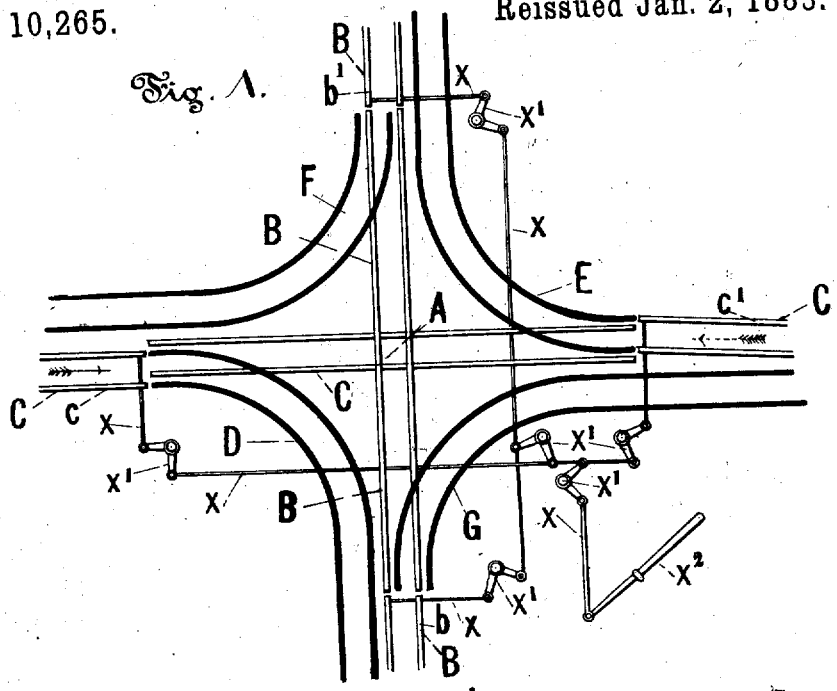
Figure 2:
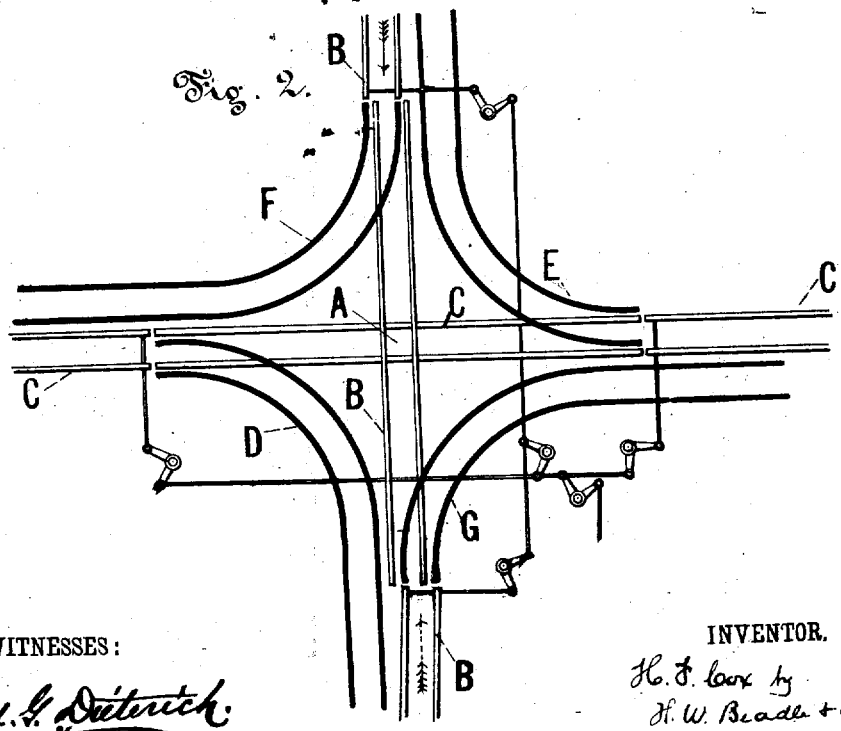
Figure 3:
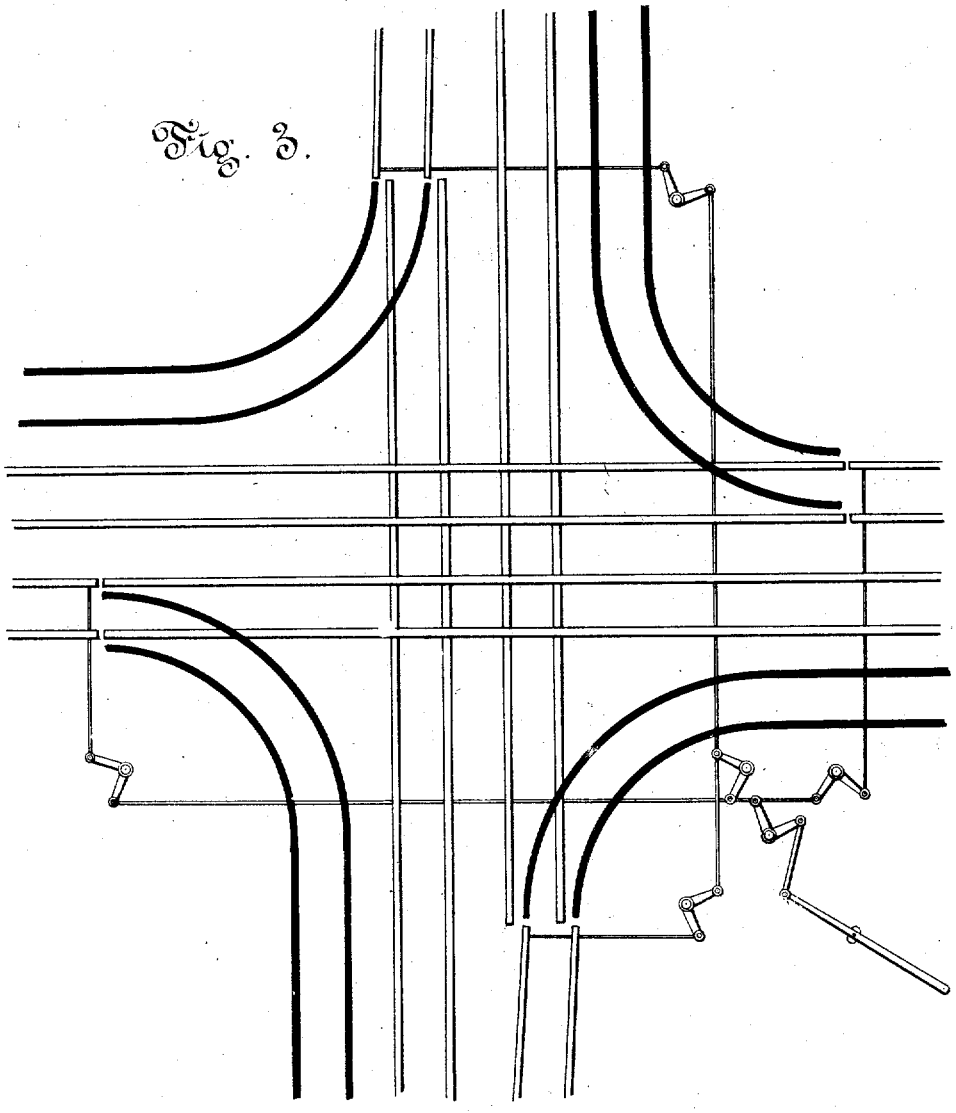

In the drawings, Figure 1 represents a railroad-crossing with my special arrangement of turn-outs and switches, the line B in this view being open for the passage of a train to its destination and the line C closed against the passage of a train, but open onto both of its turn-outs; Fig. 2, a similar view, with the line C open for the passage of a train to its destination and the line B closed against the passage of a train, but open onto both of its turn-outs; Fig. 3, a double crossing having the same arrangement of turn-outs and switches, and Fig. 4 a view illustrating the simultaneous movement of all the switches by the single actuating-lever $x^2$.

To enable others to use my invention, I will proceed to describe fully the arrangement of the same.

A represents an ordinary railroad-crossing, with the main tracks B and C connecting therewith in the usual manner, each of which has two switches, *b b′ c c′*, located at the proper points, as shown. D represents a turn-out consisting of a short piece of track, the open end of which is located in such relation to the switch *c* of the main track C as to receive, when the switch is in the position shown in Fig. 1, a train running in the direction of the arrow in full lines. This turn-out track, after curving away from the main track with which it is connected, extends to any desired distance in a line parallel with the other main track, as shown. E represents a similar turn-out, adapted, when the switch is in the position shown in Fig. 1, to receive a train upon the track C, moving in the direction of the arrow in dotted lines. F represents a similar turn-out, adapted, when the switch is in the position shown in Fig. 2, to receive a train upon the track B, moving in the direction of the arrow in full lines. G represents a similar turn-out, adapted, when the switch is in the position shown in Fig. 2, to receive a train upon the track B, moving in the direction of the arrow in dotted lines.

Figure 4:
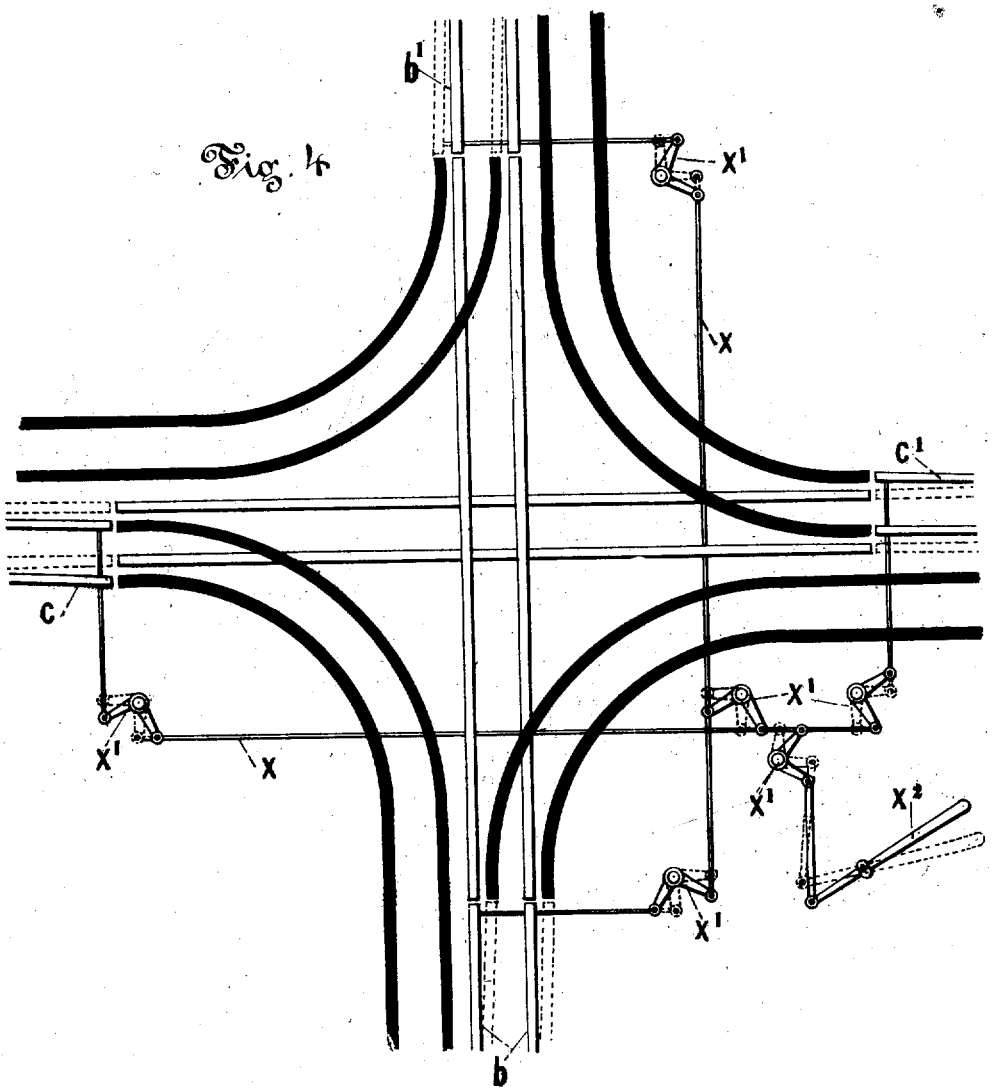

The switches of the main track, it will be observed, are so connected by pipes *x* and cranks *x′* that a single actuating-lever, $x^2$, gives them simultaneous movement, as indicated in Fig. 4, the construction being such that when the switches of one main track are moved into line with the permanent rails of the crossing to permit the passage of a train in either direction to its destination the switches of the other main track are moved into line with the permanent rails of the turn-outs, so that a train approaching in either direction, if not stopped in proper time, will be caused to pass upon a turn-out. A collision between two trains at the crossing is thus made impossible.

This invention is also applicable to a double crossing, as shown in Fig. 3. The switches leading to the turn-outs also are so connected that a system of interlocking levers may be employed, if desired.

I am aware that a single turn-out and single switch have been employed in connection with draw-bridges, and hence make no claim to such a construction; but,

Having thus fully described my invention, what I claim as new, and desire to secure by Letters Patent, is—

1. In combination with a railroad-crossing having the main tracks B and C with switches, as described, and the turn-outs D, E, F, and G, actuating mechanism, substantially as described, by means of which the switches are moved in unison to protect the track which is open for the passage of trains.

2. In combination with a railroad-crossing, A, the turn-outs D E F G, and the main tracks B C, having switches adapted to make connection either with the permanent rails of the crossing or the permanent rails of the turn outs, an actuating-lever having proper connections with the switches adapted by a single movement to connect both switches of one main track or main line with the permanent rails of the crossing to permit the passage of a train in either direction to its destination and both switches of the other main track or main line with the permanent rails of the turn-outs to cause a train approaching from either direction, if not stopped in proper time, to pass upon a turn-out.

This specification signed and witnessed this 4th day of December, 1882.

HENRY F. COX.

Witnesses:
JOHN SPARHAWK, Jr.,
WILL. A. ELSEGOOD.